(12) United States Patent
Saito

(10) Patent No.: US 12,400,335 B2
(45) Date of Patent: Aug. 26, 2025

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Kosuke Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 299 days.

(21) Appl. No.: 18/347,611

(22) Filed: Jul. 6, 2023

(65) Prior Publication Data
US 2024/0013403 A1 Jan. 11, 2024

(30) Foreign Application Priority Data
Jul. 11, 2022 (JP) ................... 2022-111340

(51) Int. Cl.
| G06T 7/00 | (2017.01) |
| G06T 7/20 | (2017.01) |
| G06T 7/70 | (2017.01) |
| G06V 10/44 | (2022.01) |
| G06V 10/74 | (2022.01) |

(52) U.S. Cl.
CPC ................ G06T 7/20 (2013.01); G06T 7/70 (2017.01); G06V 10/44 (2022.01); G06V 10/761 (2022.01); *G06V 2201/07* (2022.01)

(58) Field of Classification Search
None
See application file for complete search history.

(56) References Cited

U.S. PATENT DOCUMENTS

| 2009/0296989 | A1* | 12/2009 | Ramesh ................. G06V 20/52 382/103 |
| 2021/0133474 | A1* | 5/2021 | Sawada .................. G06N 3/045 |
| 2021/0142501 | A1* | 5/2021 | Tsunashima ............ G06T 7/246 |
| 2023/0245432 | A1 | 8/2023 | Saito |

FOREIGN PATENT DOCUMENTS

| JP | 2001-060269 A | 3/2001 |
| JP | 2019-126091 A | 7/2019 |

* cited by examiner

*Primary Examiner* — Joseph R Haley
(74) *Attorney, Agent, or Firm* — Carter, DeLuca & Farrell LLP

(57) ABSTRACT

There is provided with an information processing apparatus. A first obtaining unit obtains a reference image including a tracking target object and a search image including the tracking target object. A second obtaining unit obtains a reference image defocus amount map and a search image defocus amount map. An extracting unit extracts a feature from each of the reference image, the search image, the reference image defocus amount map, and the search image defocus amount map. A correlation calculating unit performs correlation calculation regarding a feature of the reference image and the search image and feature of the reference image defocus amount map and the search image defocus amount map. A tracking result calculating unit calculates a tracking result including a position of the tracking target object by using a result of the correlation calculation.

7 Claims, 12 Drawing Sheets

F I G. 4
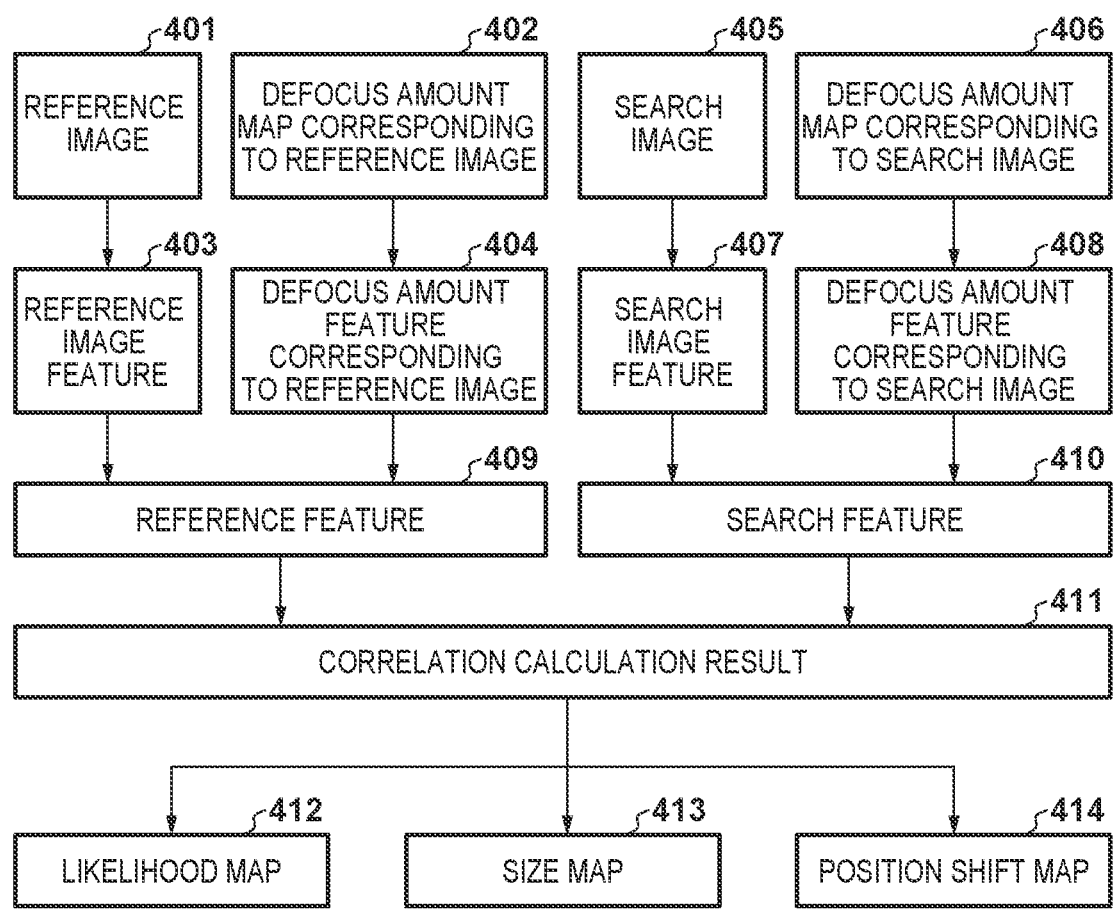

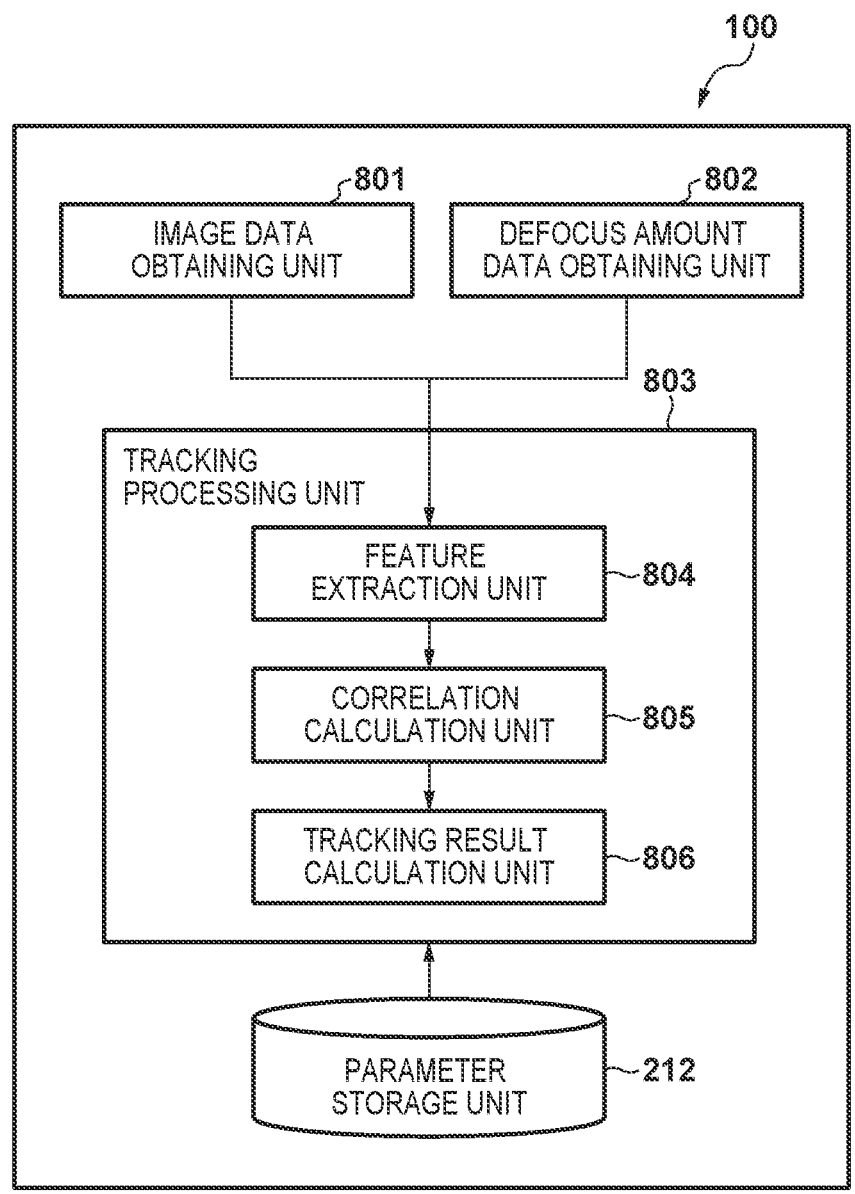

INFORMATION PROCESSING APPARATUS, CONTROL METHOD THEREOF, AND STORAGE MEDIUM

BACKGROUND OF THE INVENTION

Field of the Invention

The present invention relates to an information processing apparatus, a control method thereof, and a storage medium.

Description of the Related Art

A technique of tracking an object in images supplied in time-series is used for specification of a human face region or a body region in a motion image. The object tracking technique can be used in many fields such as, for example, a communications conference, a human machine interface, security, a monitor system for tracking any object, and image compression.

In digital still cameras and digital video cameras, the object tracking technique is used for optimization of a focus state and an exposure state of an object. For example, Japanese Patent Laid-Open No. 2001-060269 discloses a technique of automatically tracking a specific object using template matching. In template matching processing, a partial image obtained by cutting out an image region including a specific object is used as a template, and a region having high similarity with the template is calculated, whereby the specific object can be tracked. On the other hand, in the template matching processing, there is a method of using the similarity between the pixel pattern and the color histogram, but in a case where another object similar to the tracking target object exists in the video, there is a possibility of tracking the wrong object.

On the other hand, in Japanese Patent Laid-Open No. 2019-126091, by using a defocus amount as distance information, and narrowing down an image region corresponding to a set distance range, the tracking target object and a similar object are distinguished.

SUMMARY OF THE INVENTION

According to one embodiment of the present invention, an information processing apparatus comprises: a first obtaining unit configured to obtain a reference image including a tracking target object and a search image including the tracking target object; a second obtaining unit configured to obtain a reference image defocus amount map including a value indicating a defocus amount in each pixel constituting the reference image and a search image defocus amount map including a value indicating a defocus amount in each pixel constituting the search image; an extracting unit configured to extract a feature from each of the reference image, the search image, the reference image defocus amount map, and the search image defocus amount map; a correlation calculating unit configured to perform correlation calculation regarding a feature of the reference image and the search image and feature of the reference image defocus amount map and the search image defocus amount map; and a tracking result calculating unit configured to calculate a tracking result including a position of the tracking target object in the search image by using a result of the correlation calculation, wherein parameters used by the extracting unit and the tracking result calculating unit are obtained by learning by a ground truth obtaining unit configured to obtain ground truth including a position of the tracking target object, an error calculating unit configured to calculate an error from the tracking result and the ground truth, and a parameter updating unit configured to update parameters of the extracting unit and the tracking result calculating unit on a basis of the error.

According to another embodiment of the present invention, an information processing method comprises: obtaining a reference image including a tracking target object and a search image including the tracking target object; obtaining a reference image defocus amount map including a value indicating a defocus amount in each pixel constituting the reference image and a search image defocus amount map including a value indicating a defocus amount in each pixel constituting the search image; extracting a feature from each of the reference image, the search image, the reference image defocus amount map, and the search image defocus amount map; performing correlation calculation regarding a feature of the reference image and the search image and feature of the reference image defocus amount map and the search image defocus amount map; and calculating a tracking result including a position of the tracking target object in the search image by using a result of the correlation calculation, wherein parameters used by the extracting and the calculating are obtained by learning by obtaining ground truth including a position of the tracking target object, calculating an error from the tracking result and the ground truth, and updating parameters of the extracting and the calculating on a basis of the error.

According to still another embodiment of the present invention, a non-transitory computer-readable storage medium stores a program which, when executed by a computer comprising a processor and a memory, causes the computer to: obtain a reference image including a tracking target object and a search image including the tracking target object; obtain a reference image defocus amount map including a value indicating a defocus amount in each pixel constituting the reference image and a search image defocus amount map including a value indicating a defocus amount in each pixel constituting the search image; extract a feature from each of the reference image, the search image, the reference image defocus amount map, and the search image defocus amount map; perform correlation calculation regarding a feature of the reference image and the search image and feature of the reference image defocus amount map and the search image defocus amount map; and calculate a tracking result including a position of the tracking target object in the search image by using a result of the correlation calculation, wherein parameters used by the extracting and the calculating are obtained by learning by obtaining ground truth including a position of the tracking target object, calculating an error from the tracking result and the ground truth, and updating parameters of the extracting and the calculating on a basis of the error.

Further features of the present invention will become apparent from the following description of exemplary embodiments (with reference to the attached drawings).

BRIEF DESCRIPTION OF THE DRAWINGS

FIG. 4 is a view illustrating a flow of data of learning processing of the neural network according to the embodiment.

FIG. 8 is a functional configuration diagram of an inference stage of the information processing apparatus according to the embodiment.

DESCRIPTION OF THE EMBODIMENTS

Figure 1:
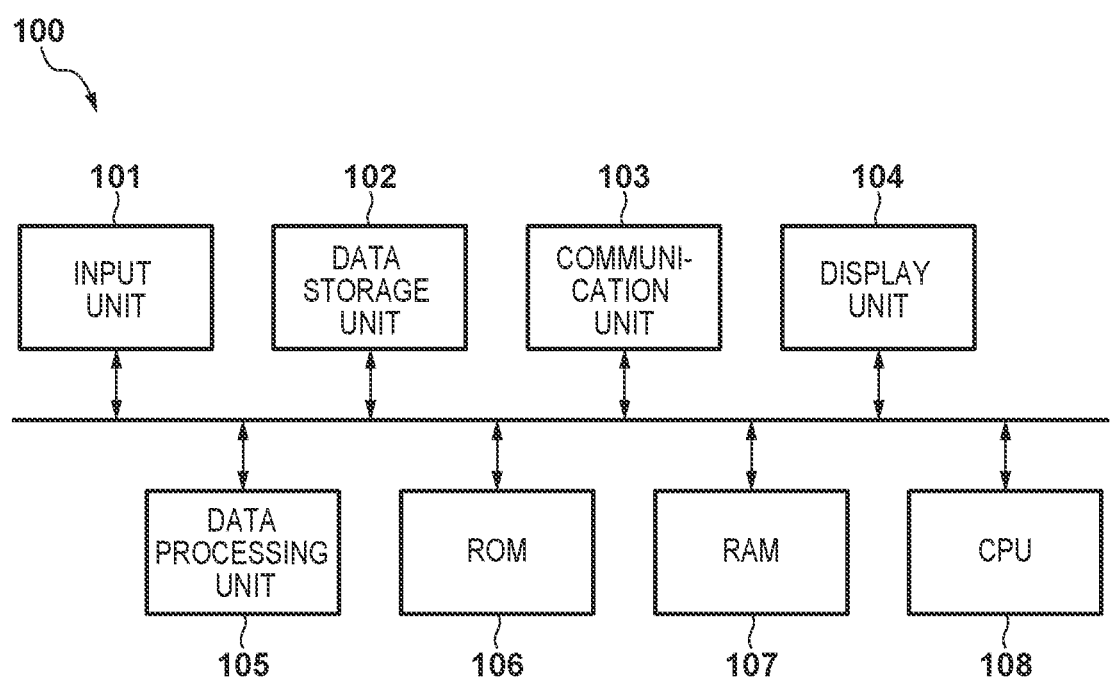
FIG. 1 is a view illustrating a hardware configuration of an information processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

When both a tracking target object and a similar object exist within a set distance range, it becomes difficult to distinguish whether or not the similar object is the tracking target, and a possibility of tracking a wrong object remains.

An embodiment of the present invention has been made in view of such a problem, and provides a technique of improving object tracking performance more than ever.

First Embodiment

FIG. 1 is a block diagram illustrating one configuration example of an information processing apparatus 100 corresponding to an embodiment. Hereinafter, an image processing apparatus that processes an input image as the information processing apparatus 100 will be described, but the processing target is not limited to an image, and may be a voice or may be data obtained by any other sensor.

An input unit 101 is an apparatus that inputs an instruction or data from a user, and includes a keyboard, a mouse, a pointer device, and a button. A data storage unit 102 stores image data, and includes, for example, a hard disk, a flexible disk, a CD-ROM, a CD-R, a DVD, a memory card, a CF card, a smart medium, an SD card, a memory stick, an xD picture card, or a USB memory. The data storage unit 102 can store programs and other data in addition to image data. Alternatively, a part of a RAM 107 described later may be used as the data storage unit 102. A storage apparatus of an external device connected by a communication unit 103 described later may be used as a virtual storage apparatus of the present apparatus.

The communication unit 103 is an interface (I/F) for mutual device communication. Note that FIG. 1 illustrates that the input unit 101, the data storage unit 102, and a display unit 104 are all included in one apparatus, but these portions may be connected via a communication path according to a known communication method. The display unit 104 displays images before and after image processing, or displays an image such as a GUI. The display unit 104 is configured by including a CRT or a liquid crystal display, and may use a display device of an external device connected via cable or the like. Furthermore, as in a known touchscreen device, the display unit 104 and the input unit 101 may be the same device. In that case, input by the touchscreen is treated as input of the input unit 101.

A data processing unit 105 assumes, as a processing target, data stored in the RAM 107, and outputs the processed data to the data storage unit 102 (or the RAM 107). On the basis of the result of the data processing, a CPU 108 performs image processing or image recognition on a motion image (a plurality of frames). The image processing or image recognition result processed by the CPU 108 is stored in the RAM 107. The data processing unit 105 may be configured as hardware using, for example, a dedicated logic circuit or a memory. Alternatively, the data processing unit 105 may be configured as software by a computer such as a CPU executing a processing program stored in a memory.

The CPU 108 functions as a control unit that controls the operation of the entire present apparatus. A ROM 106 and the RAM 107 provide the CPU 108 with programs, data, work areas, and the like necessary for processing executed by the CPU 108. When a program necessary for processing described later is stored in the data storage unit 102 or stored in the ROM 106, the CPU 108 temporarily loads the program into the RAM 107 and then executes the program. When a program is received via the communication unit 103, the CPU 108 temporarily records the program in the data storage unit 102 and then loads the program into the RAM 107, or directly writes the program from the communication unit 103 into the RAM 107 and then executes the program.

In FIG. 1, only one CPU (the CPU 108) is provided, but a plurality of them may be provided. The CPU 108 may implement the data processing unit 105 by executing a program. Although the system configuration of the apparatus includes various components other than the above, the description thereof is omitted because it is not the main subject of the present invention.

Next, a learning stage and an inference stage of a neural network executed by the data processing unit 105 and the CPU 108 in the present embodiment will be described.

Figure 2:
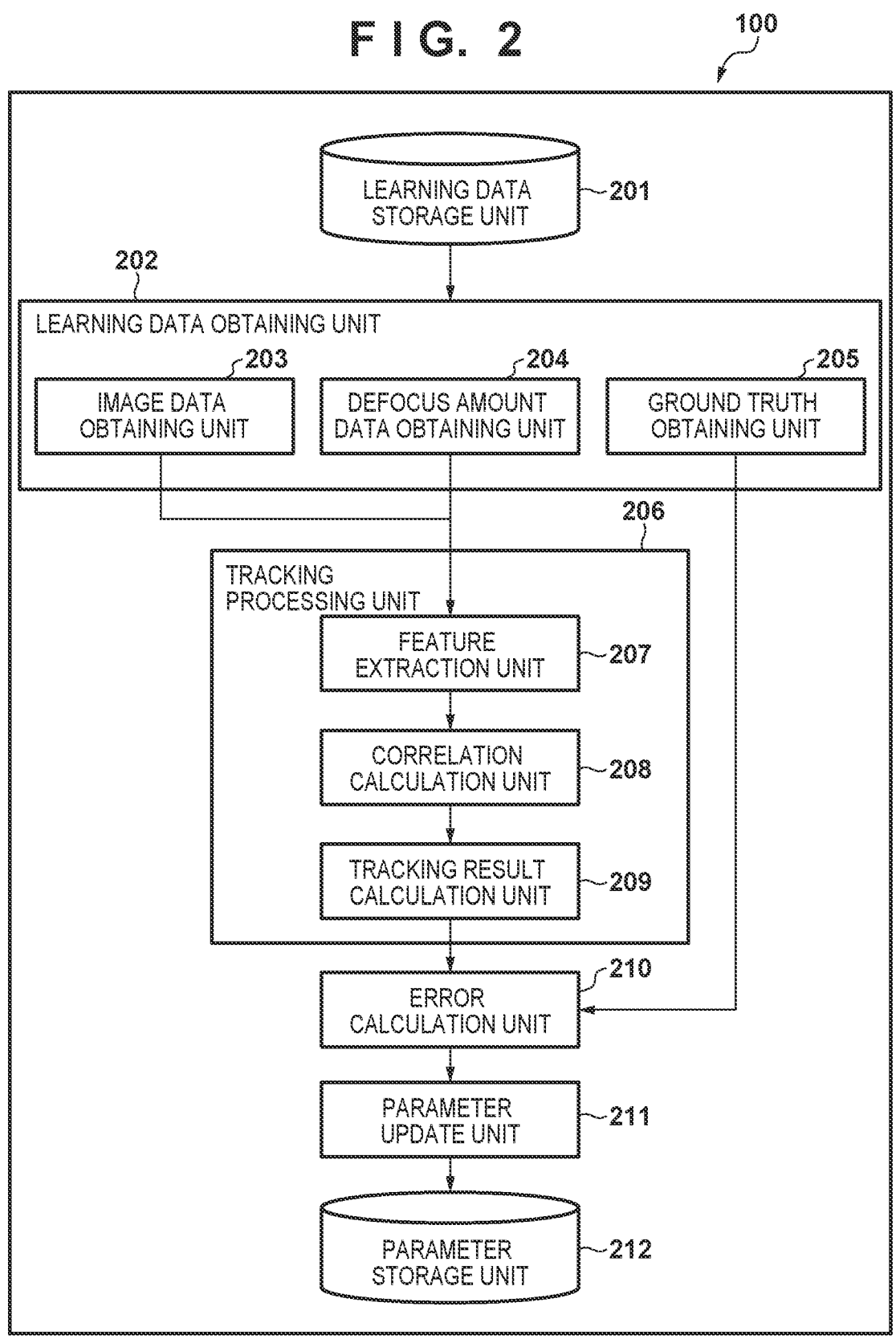
FIG. 2 is a functional configuration diagram of a learning stage of the information processing apparatus according to the embodiment.

FIG. 2 illustrates a functional configuration diagram of the information processing apparatus 100 in the learning stage. The information processing apparatus 100 includes a learning data storage unit 201, a learning data obtaining unit 202, a tracking processing unit 206, an error calculation unit 210, a parameter update unit 211, and a parameter storage unit 212. The learning data obtaining unit 202 includes an image data obtaining unit 203, a defocus amount data obtaining unit 204, and a ground truth obtaining unit 205.

The tracking processing unit 206 includes a feature extraction unit 207, a correlation calculation unit 208, and a tracking result calculation unit 209. Each functional configuration unit will be described below.

Note that in the following description, it is assumed that a reference image used in the learning stage and a reference image defocus amount map, as well as a search image and a search image defocus amount map are already stored in the data storage unit 102.

Processing of the image data obtaining unit 203, the defocus amount data obtaining unit 204, and the ground truth obtaining unit 205 in the learning data obtaining unit 202 is as follows.

The image data obtaining unit 203 obtains the reference image and the search image stored in the learning data storage unit 201. The defocus amount data obtaining unit 204 obtains a defocus amount map corresponding to the reference image and a defocus amount map corresponding to the search image that are stored in the learning data storage unit 201. Here, the defocus amount is a deviation in an image forming plane of an image obtained by multiplying an image shift amount calculated from a pair of images (an image A and an image B) having parallax in the horizontal direction by a predetermined conversion coefficient. Information of the defocus amount distribution in which a defocus amount is allocated to each pixel of an imaging plane is called a defocus amount map. The ground truth obtaining unit 205 obtains ground truth of the position and size of the object that exists in each of the reference image and the search image. Hereinafter, ground truth is called GT.

Note that the information processing apparatus in the present embodiment is assumed to be communicably connected via the communication unit 103 to a stereo imaging system on a network not illustrated. The reference image and the search image described in the embodiment are assumed to be images obtained by one of the right and left imaging units received from the stereo imaging system. On the other hand, it should be understood that as described above, the defocus amount map is data in which a value obtained by multiplying the shift amount calculated from the pair obtained from the right and left imaging units by a predetermined conversion coefficient is a pixel value.

Next, the feature extraction unit 207, the correlation calculation unit 208, and the tracking result calculation unit 209 in the tracking processing unit 206 will be described.

The feature extraction unit 207 includes a neural network. Then, the feature extraction unit 207 individually inputs the reference image and the search image obtained by the image data obtaining unit 203 into the neural network for feature extraction, and extracts one feature map for one image. The feature extraction unit 207 further individually inputs the defocus amount maps corresponding to the reference image and the search image obtained by the defocus amount data obtaining unit 204 into the neural network for feature extraction, and extracts one feature map for one image.

The correlation calculation unit 208 performs correlation calculation regarding the feature maps of the reference image and the search image obtained from the feature extraction neural network of the feature extraction unit 207 and the feature maps of the defocus amount map corresponding to the reference image and the defocus amount map corresponding to the search image.

The tracking result calculation unit 206 includes a neural network. Then, the tracking result calculation unit 206 inputs the feature maps obtained from the correlation calculation unit 208 into a tracking target object detection neural network, and estimates the position and size of the tracking target object using a likelihood map, a size map, and a position shift map that strongly react to the position of the tracking target object.

The error calculation unit 210 calculates a loss with respect to estimation results of the position and size of the tracking target object. Specifically, the error calculation unit 210 calculates an error between estimation values of the position and size of the tracking target object obtained from the tracking result calculation unit 206 and GT obtained from the learning data obtaining unit 202.

The parameter update unit 211 updates the parameters of the neural network of the tracking processing unit 206 on the basis of an error obtained by the error calculation unit 210, and stores them in the parameter storage unit 212.

Figure 3:
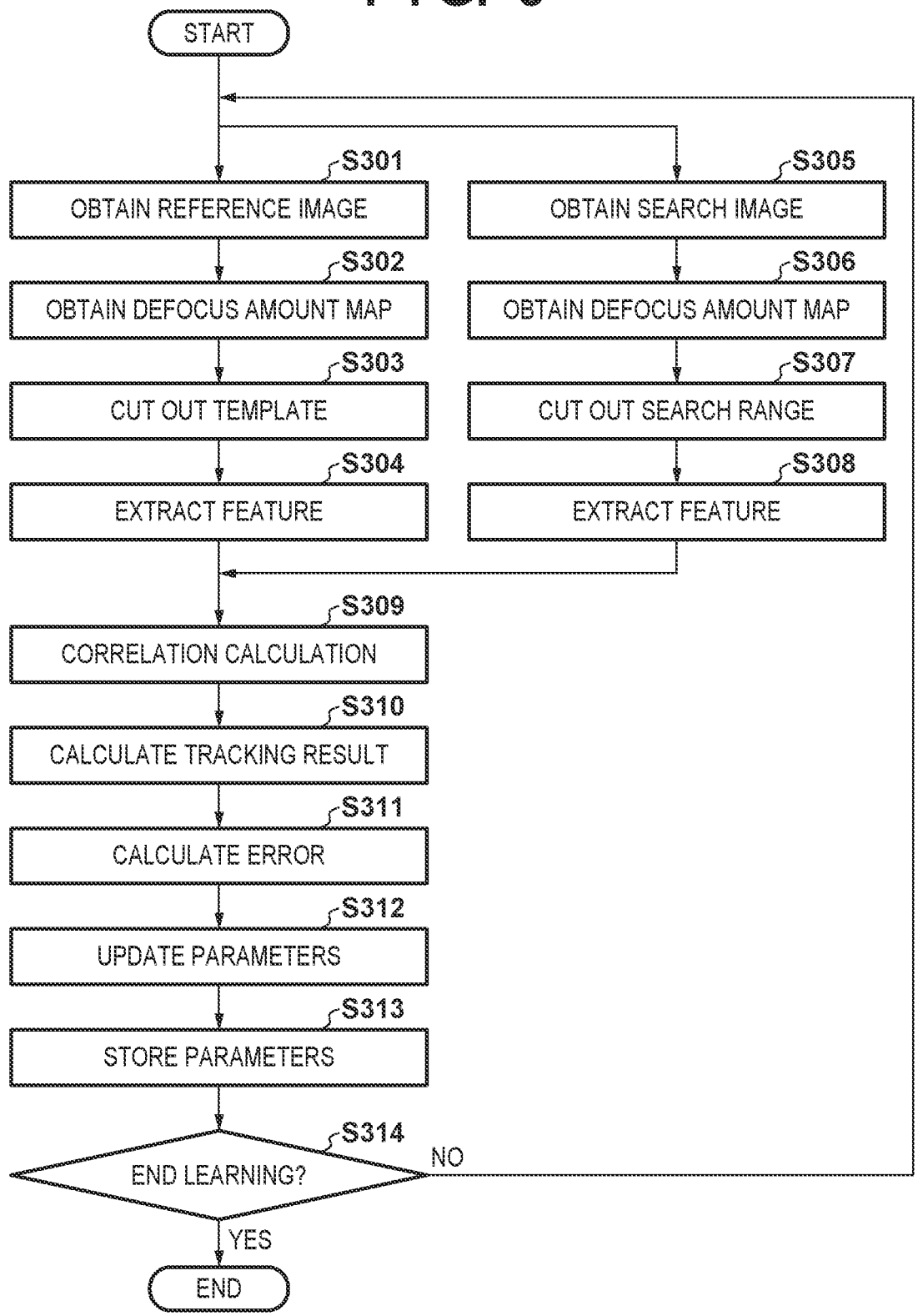
FIG. 3 is a flowchart illustrating learning processing of a neural network according to the embodiment.

FIG. 3 is a flowchart illustrating a flow of learning of the neural network in the present embodiment. However, the information processing apparatus does not necessarily need to perform all the steps described in this flowchart. FIG. 4 illustrates a flow of data. Hereinafter, a flow of learning of the neural network will be described with reference to FIGS. 3 and 4.

Figure 5A:
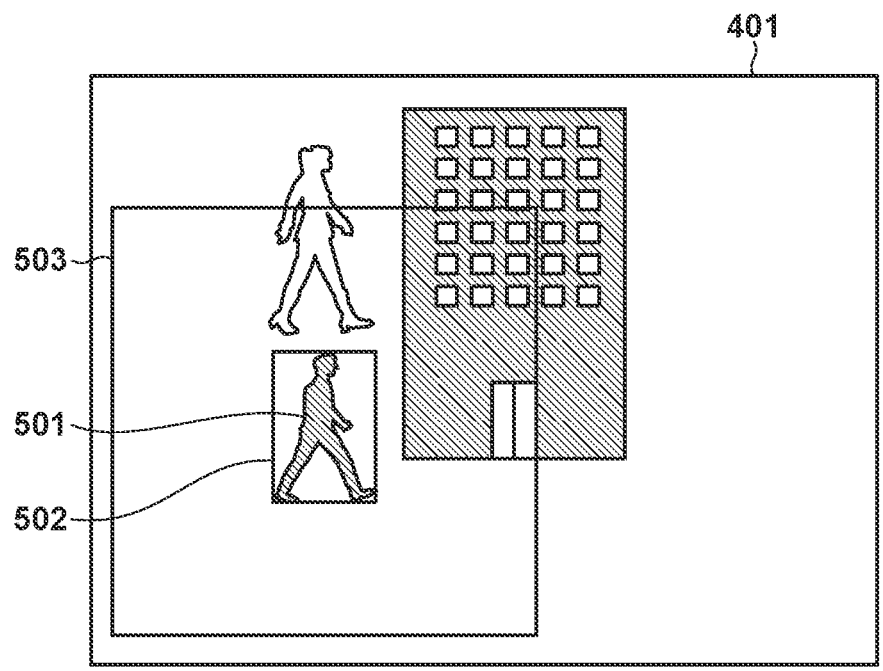
FIG. 5A.
Figure 5B:
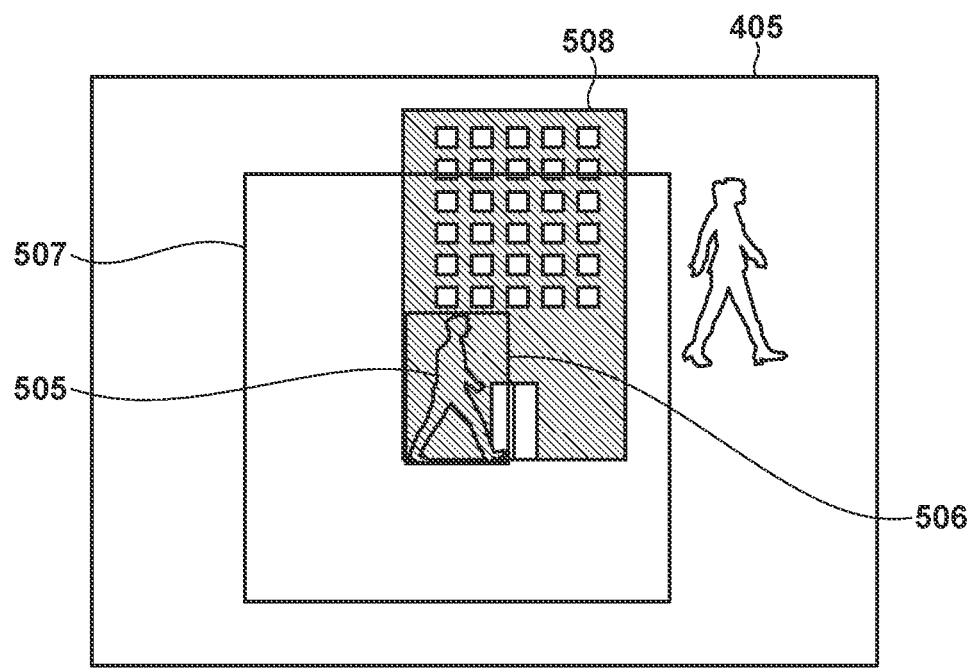
FIG. 5B are views illustrating an example of a reference image and an example of a search image according to the embodiment.

In S301, the image data obtaining unit 203 obtains an image (a reference image 401) in which the tracking target object appears and GT of the center position and the size (width and height) of the tracking target object existing in the reference image. An example of the reference image 401 is illustrated in FIG. 5A. The reference image 401 includes a tracking target object 501 and GT 502 of the position and size of the tracking target object 501.

Figure 6A:
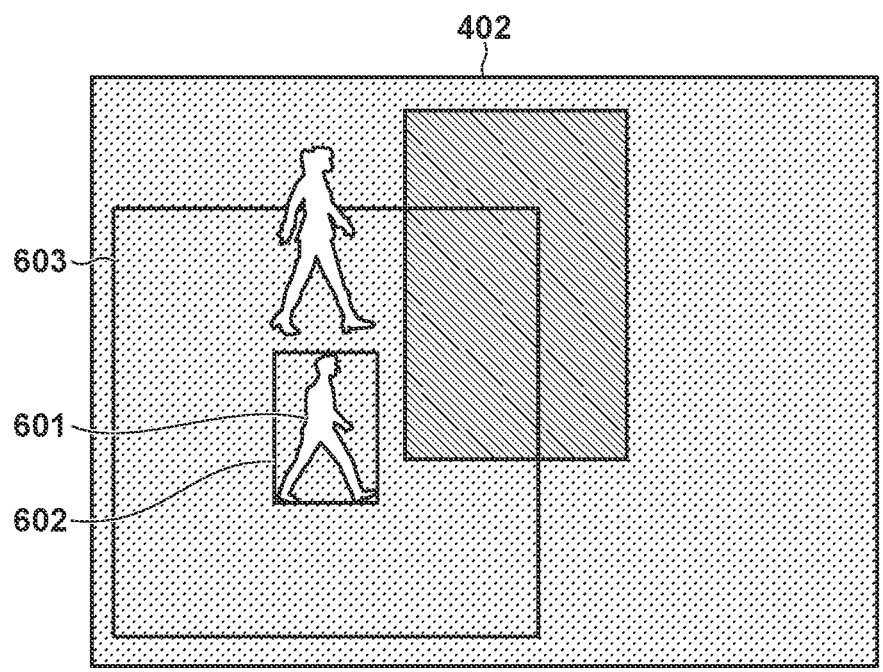
FIG. 6A.

In S302, the defocus amount data obtaining unit 204 obtains a defocus amount map 402 corresponding to the reference image 401. FIG. 6A illustrates an example of the defocus amount map 402 corresponding to the reference image 401. The defocus amount map 402 corresponding to the reference image 401 includes a tracking target object 601 and GT 602 of the position and size of the tracking target object 601.

In S303, on the basis of the position and size 502 of the tracking target object, the image data obtaining unit 203 cuts out a peripheral region 503 of the tracking target object 501 in the reference image 401 as a template, and resizes it to a preset size. Furthermore, on the basis of the position and size 602 of the tracking target, the defocus amount data obtaining unit 204 cuts out a peripheral region 603 of the tracking target object 601 in the defocus amount map 402 as a template, and resizes it to a preset size.

In S304, the feature extraction unit 207 inputs the region 503 obtained as a template in S303 to an image feature extraction neural network to obtain a reference image feature 403 corresponding to the region of the tracking target object. The feature extraction unit 207 inputs the region 603 to a defocus amount feature extraction neural network to obtain a defocus amount feature 404.

In S305, the image data obtaining unit 203 obtains a set of an image (a search image 405) for searching for the tracking target object and GT of the position and size of the tracking target object existing in the image. For example, the image data obtaining unit 203 obtains an image at another time in a same sequence as the image selected in S301 as a search image for searching for the tracking target object. An example of the search image 405 is illustrated in FIG. The search image 405 includes a tracking target object 505 and GT 506 of the position and size of the tracking target object 505.

Figure 6B:
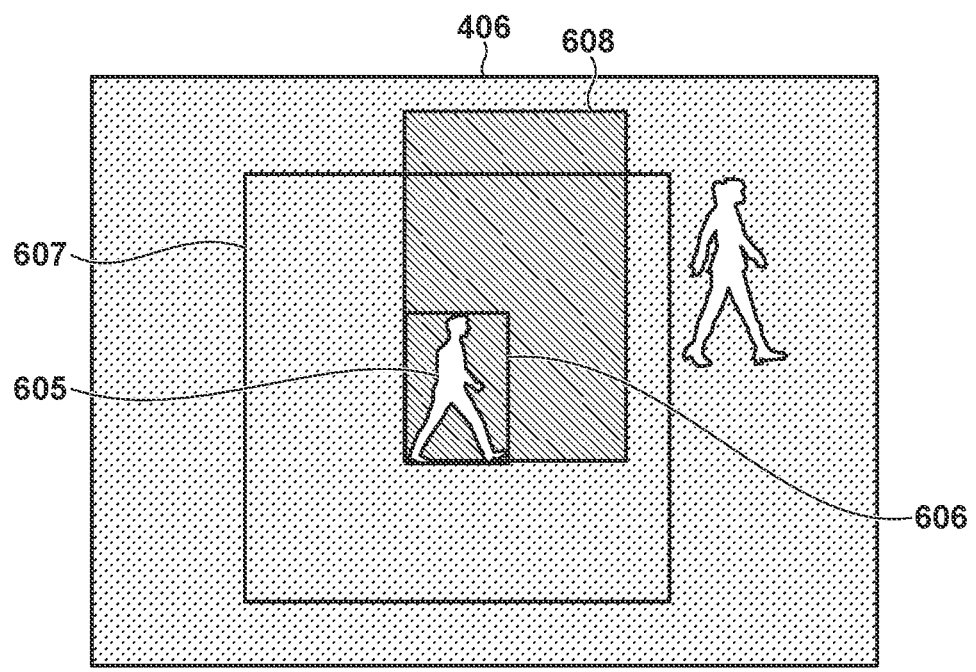
FIG. 6B are views illustrating an example of a reference defocus amount map and an example of a search defocus amount map according to the embodiment.

In S306, the defocus amount data obtaining unit 203 obtains a defocus amount map 406 corresponding to the search image 405. FIG. 6B illustrates an example of the defocus amount map 406 corresponding to the search image 405. The defocus amount map 406 corresponding to the search image 405 includes a tracking target object 605 and GT 606 of the position and size of the tracking target object 605.

In S307, on the basis of the position and size 506 of the tracking target object, the image data obtaining unit 203 cuts out and resizes a peripheral region 507 of the tracking target object 505 in the search image 405 obtained in S304. Furthermore, on the basis of the position and size 606 of the tracking target, the defocus amount data obtaining unit 204 cuts out a peripheral region 607 of the tracking target object 605 in the defocus amount map 406 as a template, and resizes it. The target size of the resizing is the same as the size in S303.

In S308, the feature extraction unit 207 inputs the region 507 obtained in S307 to the image feature extraction neural network to obtain a search image feature 407. The feature extraction unit 207 inputs the region 607 to the defocus amount feature extraction neural network to obtain a defocus amount feature 408.

Note that the flowchart of FIG. 3 illustrates that the processing of S301 to S304 and the processing of S305 to S308 are performed in parallel, but either one may be performed first and the processing may be sequentially performed.

In S309, the correlation calculation unit 208 combines the reference image feature 403 of the template obtained in S304 and the defocus amount feature 404 corresponding to the reference image to obtain a reference feature 409. At that time, the template feature may be cut out for only a specific region. Furthermore, the correlation calculation unit 208 combines the search image feature 407 and the defocus amount feature 408 corresponding to the search image to obtain a search feature 410. Then, the correlation calculation unit 208 performs correlation calculation regarding the reference feature 409 and the search feature 410 to obtain a correlation calculation result 411.

Figure 7A:
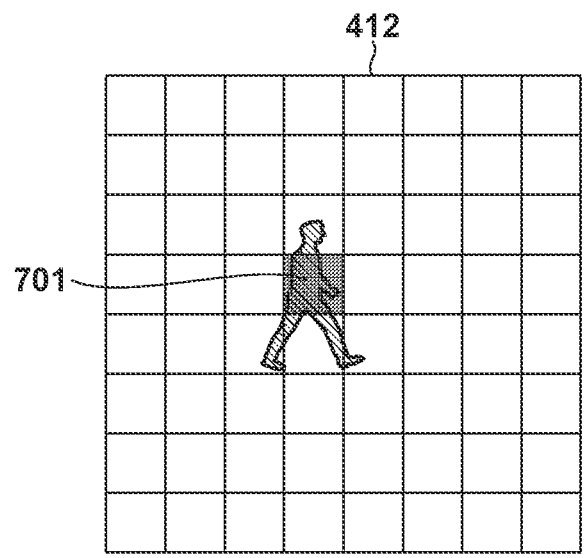
FIG. 7A.
Figure 7B:
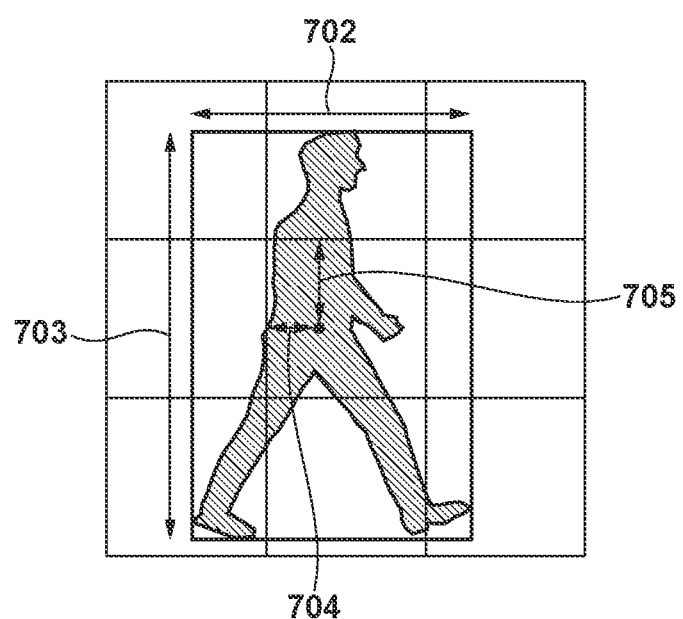
FIG. 7B are views illustrating examples of output of a tracking result calculation unit according to the embodiment.

In S310, the tracking result calculation unit 206 inputs the correlation calculation result 411 obtained in S309 to the tracking target object detection neural network, and outputs a likelihood map 412, a size map 413, and a position shift map 414. FIG. 7A illustrates the likelihood map 412, and FIG. 7B illustrates the size map 413 and position shift map 414 that are enlarged. The likelihood map 412 assumes a real number of 0 to 1 in each square of a predetermined grid. For example, when the value of a square 701 on the likelihood map 412 in which the tracking target object 505 exists is relatively larger than the values of other squares, it can be said that the likelihood map 412 correctly reacts to the tracking target object 505. The size map estimates a width 702 and a height 703 of the tracking target object 505. The position shift map estimates position shift in a square where the tracking target object 505 exists in the grid of the likelihood map 412. More specifically, as illustrated in FIG. 7B, position shift 704 in the horizontal direction and position shift 705 in the vertical direction of the center of a tracking target object 705 are estimated on the basis of the upper left corner of the square 701.

In S311, the error calculation unit 210 calculates a loss with respect to inference results of the position and size of the tracking target. An object is to advance learning so that the tracking target object can be correctly detected. Therefore, the error calculation unit 210 calculates a loss $Loss_c$ for the estimated likelihood map, a loss $Loss_s$ for the size, and a loss $Loss_l$ for the position shift.

The loss $Loss_c$ is defined by the following Equation (1). Equation (1) indicates that the likelihood map of the tracking target object obtained in S310 is denoted by $C_{inf}$ and the map to be GT is denoted by $C_{gt}$, and the sum of cross cross entropy errors is calculated as $Loss_c$ with respect to the values of squares of the grids of the map $C_{inf}$ and the map $C_{gt}$. Here, $C_{gt}$ is a map in which the value of the position where the tracking target object exists is 1 and the other positions are 0.

$$Loss_c = \frac{1}{N}\Sigma(-C_{gt}\log(C_{inf}) - (1-C_{gt})\log(1-C_{inf})) \quad \text{Equation (1)}$$

The loss $Loss_s$ is defined by the following Equation (2). Equation (2) indicates that the sum of square errors is the loss $Loss_s$ with respect to the values of squares of the grids of a size map $S_{inf}$ of the tracking target object obtained in S310 and $S_{gt}$ to be GT.

$$Loss_s = \frac{1}{N}\Sigma(S_{inf} - S_{gt})^2 \quad \text{Equation (2)}$$

The loss $Loss_l$ is defined by the following Equation (3). Equation (3) indicates that the sum of the square errors is the loss $Loss_l$ with respect to the values of squares of the grids of a position shift map $L_{inf}$ of the tracking target object obtained in S310 and $L_{gt}$ to be GT.

$$Loss_l = \frac{1}{N}\Sigma(L_{inf} - L_{gt})^2 \quad \text{Equation (3)}$$

In the end, a value $loss_{inf}$ obtained by integrating the above-described three losses is calculated by the following Equation (4).

$$Loss_{inf} = Loss_s + Loss_l \quad \text{Equation (4)}$$

Note that in the embodiment, the loss is described in the form of binary cross entropy and a mean square error, but the loss is not limited to this.

On the basis of the loss calculated in S311, using an error back propagation method, the parameter update unit 211 updates in S312 the parameters of the image feature extraction neural network, the defocus amount feature extraction neural network, and the tracking target object detection neural network. The parameters to be updated here refer to the weight of the neural network in the feature extraction unit 207 and the tracking result calculation unit 209 in the tracking processing unit 206.

In S313, the parameters of the neural network updated by the parameter update unit 211 are stored in the parameter storage unit 212. The flow up to this point is defined as learning of one iteration.

In S314, the parameter update unit 211 determines whether or not to end learning. In end determination of learning, it is assumed that the end is determined in a case where the value of the loss obtained by Equation (4) becomes smaller than a preset threshold. A case where learning has been performed a predetermined number of times (to be set or selectable by the user with the input unit 101) may be determined as end.

Next, the configuration and processing of the information processing apparatus 100 in a case of transitioning to the inference stage through the learning stage will be described.

FIG. 8 illustrates a functional configuration diagram of the information processing apparatus 100 in the inference stage. The information processing apparatus 100 includes an image data obtaining unit 801, a defocus amount data obtaining unit 802, a tracking processing unit 803, and the parameter storage unit 212. The tracking processing unit 803 includes a feature extraction unit 804, a correlation calculation unit 805, and a tracking result calculation unit 806. Each configuration will be described below.

Note that in the following description, it is assumed that a reference image used in the inference stage and a reference image defocus amount map, as well as a search image and a search image defocus amount map are already stored in the data storage unit 102. However, these may be input from an external imaging apparatus or the like via the communication unit 103.

The image data obtaining unit 801 obtains a tracking target image and a search image, and supplies them to the tracking processing unit 803. The defocus amount data obtaining unit 802 obtains defocus amount maps respectively corresponding to the tracking target image and the search image, and supplies them to the tracking processing unit 803.

The feature extraction unit 804 in the tracking processing unit 803 individually inputs the tracking target image and the search image supplied from the image data obtaining unit 801 to the image feature extraction neural network, and causes one feature map to be extracted for one image. The feature extraction unit 804 individually inputs the defocus amount maps respectively corresponding to the tracking target image and the search image supplied from the defocus amount data obtaining unit 802 to the defocus amount feature extraction neural network, and causes one feature map to be extracted for one defocus amount map.

The correlation calculation unit 805 performs correlation calculation regarding the feature of the tracking target and the feature of the search. More specifically, the correlation calculation unit 805 combines the feature map of the tracking target image obtained from the feature extraction neural network of the feature extraction unit 804 and the feature map of the defocus amount map corresponding thereto, and cuts out a peripheral region of the tracking target region to obtain a reference feature. Furthermore, the correlation calculation unit 805 combines the features extracted by the feature extraction unit 803 from the search image and the defocus amount map corresponding thereto to obtain a search feature. Then, the correlation calculation unit 805 performs correlation calculation regarding the reference feature and the search feature obtained above.

The tracking result calculation unit 806 inputs the feature maps obtained from the correlation calculation unit 805 into a tracking target object detection neural network, and estimates the position and size of the tracking target object using a likelihood map, a size map, and a position shift map that strongly react to the position of the tracking target object.

The parameter storage unit 212 stores parameters updated at the time of learning, and the parameters of the neural network in the tracking processing unit 803 are obtained from the parameter storage unit 212.

Figure 9:
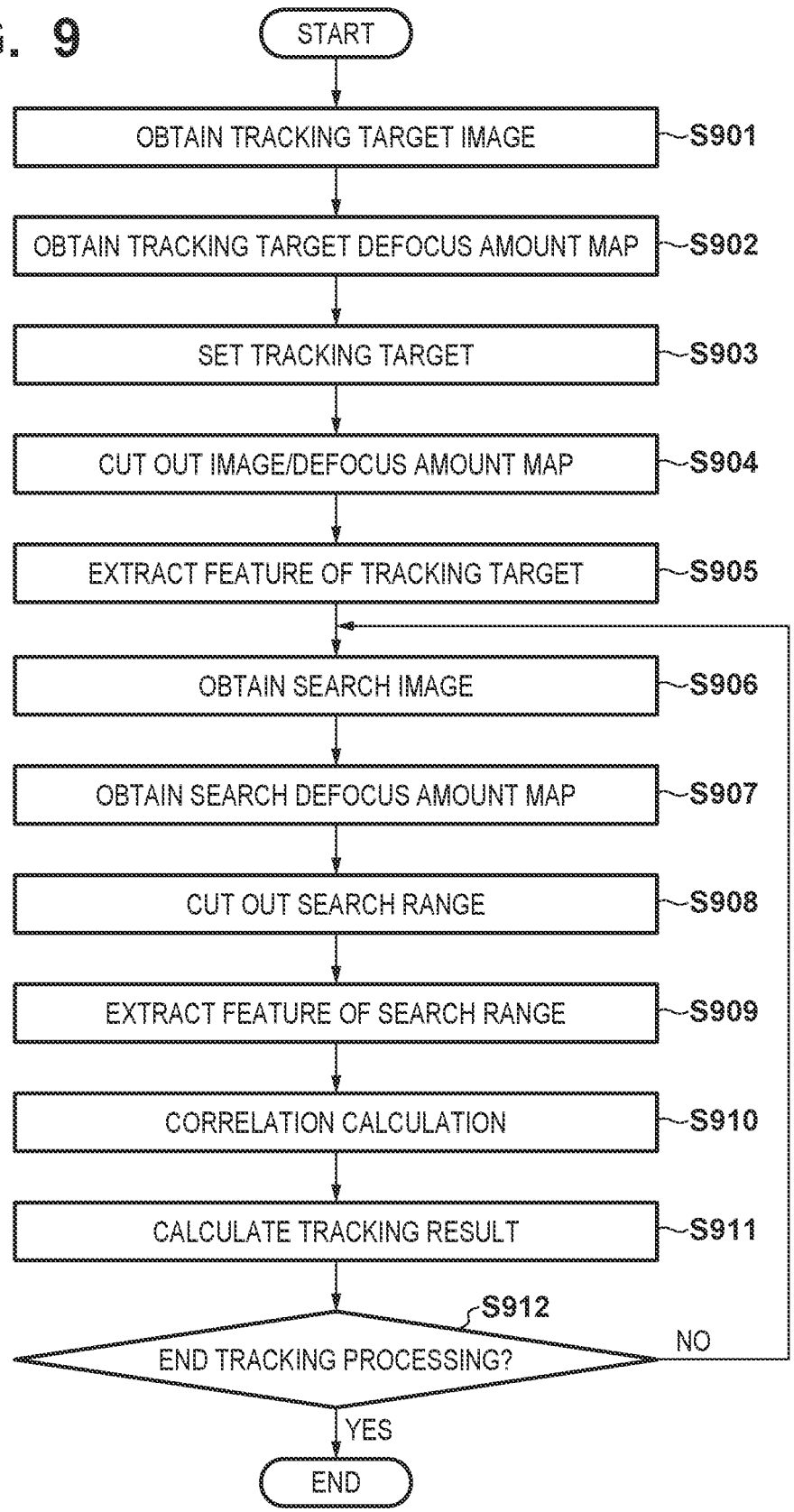
FIG. 9 is a flowchart illustrating inference processing of the neural network according to the embodiment.

FIG. 9 is a flowchart illustrating a processing procedure in the inference stage of the neural network in the present embodiment. However, the information processing apparatus 100 does not necessarily need to perform all the steps described in this flowchart.

In S901, the image data obtaining unit 801 obtains an image (a tracking target image) in which the tracking target object appears.

In S902, the defocus amount data obtaining unit 802 obtains a defocus amount map corresponding to the tracking target image.

In S903, the tracking processing unit 803 displays the tracking target image on the display unit 104, specifies a region in the displayed tracking target image in accordance with an instruction from the user via the input unit 101, and sets the tracking target object. If the display unit 104 allows a touch input, an object at a position touched by the user is set as a tracking target. The tracking target object may be detected by other methods, and for example, a method of detecting an object with an object detector is conceivable.

In S904, the tracking processing unit 803 cuts out an image around the tracking target object and a defocus amount map.

In S905, the feature extraction unit 804 supplies the cutout image obtained in S904 to the image feature extraction neural network to obtain an image feature corresponding to the region of the tracking target object. The feature extraction unit 804 supplies the cutout defocus amount map obtained in S904 to the defocus amount feature extraction neural network to obtain a defocus amount feature.

In S906, the image data obtaining unit 801 obtains an image for searching for the tracking target object. For example, an image at a time next to the tracking target image selected in S901 is obtained as an image for searching for the tracking target object.

In S907, the defocus amount data obtaining unit 802 obtains a defocus amount map corresponding to the search image.

In S908, the tracking processing unit 803 cuts out and resizes the search image obtained in S906 and the defocus amount map obtained in S907. The region to be cut out is a peripheral region of the tracking target object estimated at the previous time, for example.

In S909, the feature extraction unit 804 inputs the image obtained in S908 to the image feature extraction neural network to obtain a search image feature. The feature extraction unit 804 inputs the defocus amount map obtained in S908 to the defocus amount feature extraction neural network to obtain a defocus amount feature.

In S910, the correlation calculation unit 805 combines the image feature of the tracking target object and the defocus amount feature that are obtained in S905 to obtain a tracking target feature. At that time, the feature of the tracking target object may be cut out for only a specific region. Furthermore, the correlation calculation unit 805 combines the search range image and the defocus amount feature obtained in S909 to obtain a search feature. Then, the correlation calculation unit 805 performs correlation calculation regarding the tracking target feature and the search feature.

In S911, the tracking result calculation unit 806 inputs the result of the correlation calculation obtained in S910 to the tracking target object detection neural network, and outputs estimation values of the likelihood map, the size map, and the position shift map.

As described above, according to the present first embodiment, by adding not only an image but also a defocus amount map to input data, information in a depth direction is added, and the tracking target can be identified from a difference in the depth direction even in an object in which the pixel pattern and the color histogram are similar. Furthermore, even in a case where there is a similar object at a position close in the depth direction with respect to the tracking target object, the feature including contour information can be used by feature extraction of the defocus amount map, and the tracking target can be identified.

Second Embodiment

In a case where the defocus amount data is not necessarily accurate, if the defocus amount data is referred to, tracking performance may be deteriorated. Therefore, the present embodiment takes a measure against the above-described problem.

Figure 10:
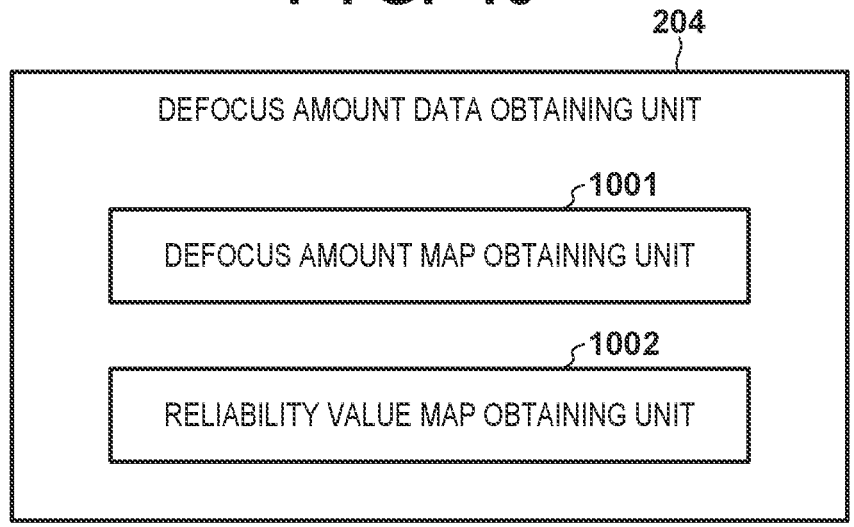
FIG. 10 is a functional configuration diagram of a defocus amount data obtaining unit according to a second embodiment.

FIG. 10 is a functional configuration diagram of the defocus amount data obtaining unit 204 in the information processing apparatus 100 in the learning stage. In a case of the present second embodiment, the defocus amount data obtaining unit 204 includes a defocus amount map obtaining unit 1001 and a reliability value map obtaining unit 1002.

The defocus amount map obtaining unit 1001 obtains a defocus amount map similarly to the first embodiment. Then, the reliability value map obtaining unit 1002 obtains a reliability value map corresponding to the defocus amount map.

Here, the reliability value map will be described. The reliability value map is a map corresponding to the defocus amount map, and the reliability of the corresponding defocus amount is assumed to be low in a case where the reliability value is small. The reliability value may be calculated using any method, and may be calculated on the basis of an image shift amount detected from a pair of image regions having parallax in the horizontal direction as in Japanese Patent Laid-Open No. 2019-126091, for example.

The reliability value map obtained by the reliability value map obtaining unit 1002 is handled similarly to the defocus amount map in the first embodiment. More specifically, the following operation is performed in the learning of the flowchart of FIG. 3.

In S302, the defocus amount data obtaining unit 204 obtains a defocus amount map corresponding to a reference image and obtains a reliability value map corresponding thereto.

In S303, the image data obtaining unit 203 performs cutout also for the reliability value map in addition to the reference image and the defocus amount map.

In S304, the feature extraction unit 207 performs feature extraction by inputting the reference image cut out in S303 to the image feature extraction neural network, and inputting the defocus amount map and the reliability value map to the defocus amount feature extraction neural network.

In S306, the defocus amount data obtaining unit 203 obtains a defocus amount map corresponding to the search image and obtains a reliability value map corresponding thereto.

In S307, the image data obtaining unit 203 performs cutout and resizing also for the search image, the defocus amount map, and the reliability value map.

In S308, the feature extraction unit 207 inputs the search image cut out in S307 to the image feature extraction neural network to obtain the search image feature 407. The feature extraction unit 207 inputs the defocus amount map and the reliability value map to the defocus amount feature extraction neural network to obtain a defocus amount feature.

In S309, the correlation calculation unit 208 combines the reference image feature obtained in S304 and the defocus amount feature corresponding thereto to obtain a reference feature. At that time, the template feature may be cut out for only a specific region. Furthermore, the search image feature obtained in S308 and the defocus amount feature corresponding thereto are combined to obtain a search feature. Then, correlation calculation is performed regarding the reference feature and the search feature.

In and after S310, the same operation as that in the first embodiment is performed.

According to the second embodiment, by inputting the reliability value map together with the defocus amount map to the feature extraction neural network, the region having a low reliability value is learned so as not to affect estimation of the likelihood map, the size map, and the position shift map. This enables the tracking performance to be maintained or improved even in a case where the reliability value map is low.

Third Embodiment

Defocus amount data varies depending on an optical characteristic of a lens to be used and imaging conditions such as a focus lens position and a zoom position. Therefore, in a case where learning is performed with defocus amount data obtained by a lens having a specific optical characteristic and under a specific imaging condition, the parameters obtained by it can bring an effect of tracking performance improvement only with the optical characteristic of the lens and the imaging condition meeting the above-described condition. On the other hand, in a case where defocus amount data obtained with various lenses and imaging conditions is used in learning, learning with an enormous data amount is required. Therefore, the present third embodiment takes a measure against the above-described problem.

Figure 11:
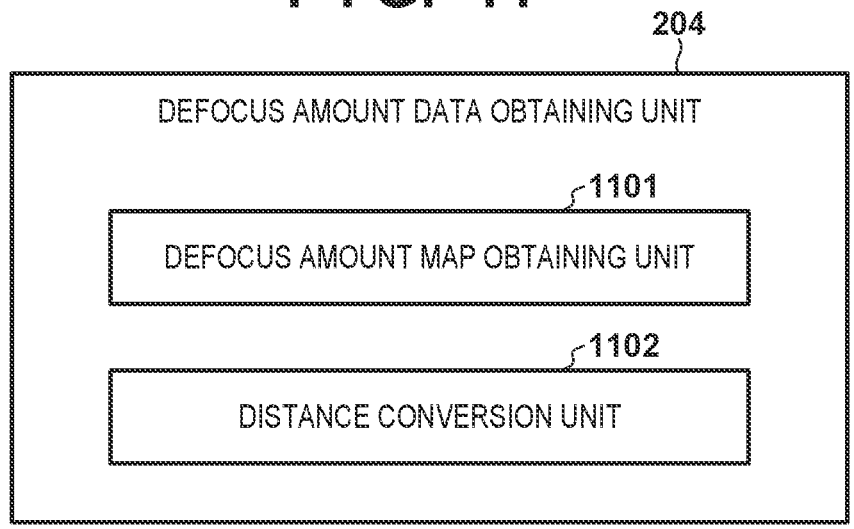
FIG. 11 is a functional configuration diagram of a defocus amount data obtaining unit according to a third embodiment.

FIG. 11 is a functional configuration diagram of the defocus amount data obtaining unit 204 in the information processing apparatus 100 in the learning stage. In a case of the present third embodiment, the defocus amount data obtaining unit 204 includes a defocus amount map obtaining unit 1101 and a distance conversion unit 1102. The distance conversion unit 1102 will be described below.

The defocus amount map obtaining unit 1101 obtains a defocus amount map similarly to the first embodiment. The distance conversion unit 1102 converts the defocus amount map obtained by the defocus amount map obtaining unit 1101 into a distance map based on the position where the defocus amount is 0. A method of converting the defocus amount map into the distance map is not particularly limited, and here, two methods will be described, that is, a method of geometrically converting and a method of obtaining a conversion parameter by learning.

Figure 12:
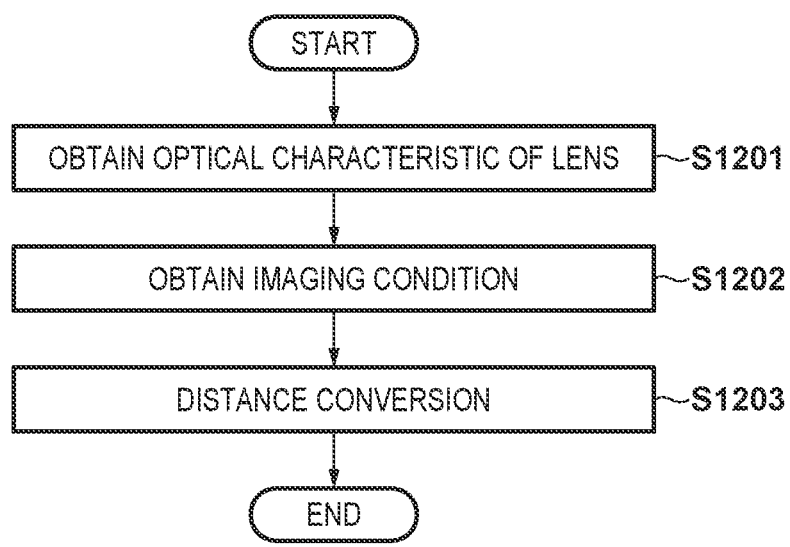
FIG. 12 is a flowchart illustrating distance conversion processing of a defocus amount map according to the third embodiment.

FIG. 12 illustrates a flowchart for geometrically converting the defocus amount map into the distance map in the present embodiment.

In S1201, the distance conversion unit 1102 obtains an optical characteristic of the lens used by the imaging apparatus used at the time of obtaining the defocus amount map to be converted now. Here, the optical characteristic of the lens refers to the relationship among an object side distance, an image plane side distance, and a focal length.

In S1202, the distance conversion unit 1102 obtains an imaging condition of an image at the time of obtaining the defocus amount map. Here, the imaging condition refers to the position and focal length of the focus lens in the lens used by the imaging apparatus.

In S1203, the distance conversion unit 1102 calculates the image plane side distance from the value of the defocus amount map and the position of the focus lens obtained in S1202. Then, the distance conversion unit 1102 calculates an object side distance from the above-described image plane side distance and the focal length obtained in S1202 by the optical characteristic obtained in S1201, and converts it into a distance map based on the position where the defocus amount is 0.

The above is the method of geometrically converting the defocus amount map into the distance map.

On the other hand, in a case of data where the optical characteristic of the lens and the imaging condition are unknown, geometric conversion cannot be performed. In such a case, distance conversion is performed not by geometric conversion but by a method of learning and obtaining conversion parameters by data where the optical characteristic of the lens and the imaging condition are known. Hereinafter, the learning method will be described.

Figure 13:
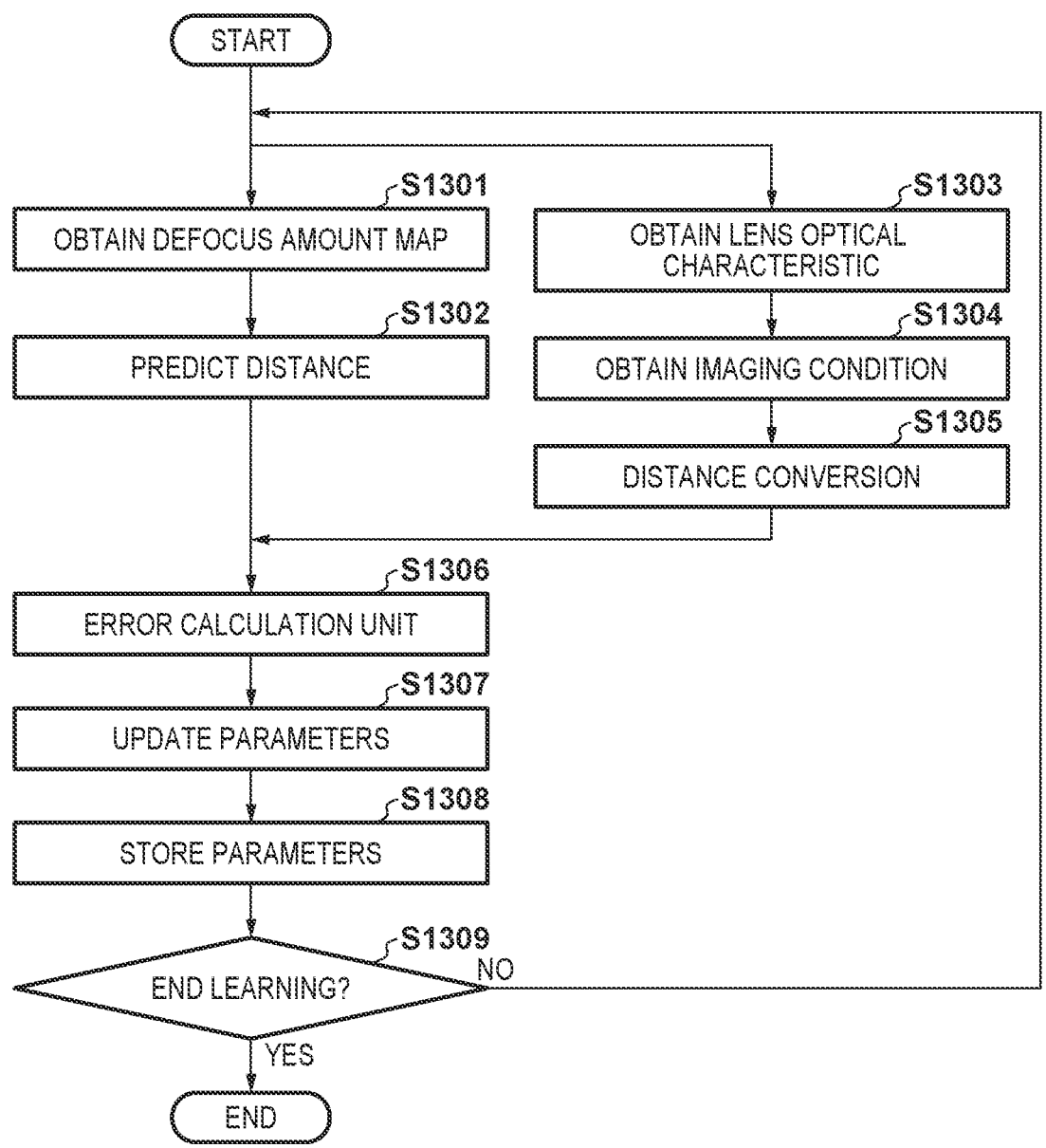
FIG. 13 is a flowchart illustrating learning processing of a distance conversion parameter of the defocus amount map according to the third embodiment.

FIG. 13 is a flowchart illustrating learning processing of a distance map conversion parameter of the defocus amount map in the present third embodiment.

In S1301, the distance conversion unit 1102 obtains a defocus amount map. Then, in S1302, with the defocus amount map as an input, the distance conversion unit 1102 predicts the distance map based on the position where the defocus amount is 0.

In S1303, the distance conversion unit 1102 obtains the optical characteristic of the lens used at the time of obtaining the defocus amount map. In S1304, the distance conversion unit 1102 obtains the imaging condition at the time of obtaining the defocus amount map. Then, in S1305, the defocus amount map is geometrically converted into a distance map on the basis of the optical characteristic of the lens obtained in S1303 and the imaging condition obtained in S1304. The data obtained by this conversion is set as ground truth.

In S1306, the distance conversion unit 1102 calculates a cross entropy error from the distance map predicted in S1302 and the ground truth converted in S1305, and sets this as a loss.

In S1307, the distance conversion unit 1102 updates the parameters of distance map prediction using the error back propagation method on the basis of the loss calculated in S1306. The parameters to be updated here refer to the weight of the neural network in the distance map prediction.

In S1308, the distance conversion unit 1102 stores the parameters of the neural network updated in S1307. The flow up to this point is defined as learning of one iteration.

In S1309, the distance conversion unit 1102 determines whether or not to end learning. In end determination of learning, the end is determined in a case where the value of the loss obtained in S1306 becomes smaller than a predetermined threshold. Alternatively, a case where learning has been performed a predetermined number of times may be determined as end.

The distance conversion unit 1102 created geometrically or by learning as described above is used after obtaining the defocus amount map at the time of learning or inference of tracking.

More specifically, for example, at the time of learning, in S302, the defocus amount map obtaining unit obtains a defocus amount map corresponding to the reference image. Then, the defocus amount map is converted into a distance map by the distance conversion unit 1102.

In S306, the defocus amount map obtaining unit obtains a defocus amount map corresponding to the search image. Then, the defocus amount map is converted into a distance map by the distance conversion unit 1102. The subsequent learning flow is similar to that of the first embodiment.

As described above, according to the third embodiment, by using the optical characteristic of the lens and the imaging conditions, it is possible to convert the defocus amount map into a distance map based on the position where the defocus amount is 0. By learning the conversion parameter of distance map prediction using data in which the optical characteristic of the lens and the imaging condition are known, it is possible to accurately predict the distance map from data in which the optical characteristic of the lens and the imaging condition are unknown.

As described above, since the defocus amount map obtained with various optical characteristics of the lens and imaging conditions can be converted into a certain distance map, it becomes possible to perform learning and inference of tracking regardless of the optical characteristic of the lens to be used and the imaging condition.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-111340, filed Jul. 11, 2022, which is hereby incorporated by reference herein in its entirety.

What is claimed is:

1. An information processing apparatus comprising:
a first obtaining unit configured to obtain a reference image including a tracking target object and a search image including the tracking target object;
a second obtaining unit configured to obtain a reference image defocus amount map including a value indicating a defocus amount in each pixel constituting the reference image and a search image defocus amount map including a value indicating a defocus amount in each pixel constituting the search image;
an extracting unit configured to extract a feature from each of the reference image, the search image, the reference image defocus amount map, and the search image defocus amount map;

a correlation calculating unit configured to perform correlation calculation regarding a feature of the reference image and the search image and feature of the reference image defocus amount map and the search image defocus amount map; and a tracking result calculating unit configured to calculate a tracking result including a position of the tracking target object in the search image by using a result of the correlation calculation, wherein parameters used by the extracting unit and the tracking result calculating unit are obtained by learning by a ground truth obtaining unit configured to obtain ground truth including a position of the tracking target object, an error calculating unit configured to calculate an error from the tracking result and the ground truth, and a parameter updating unit configured to update parameters of the extracting unit and the tracking result calculating unit on a basis of the error.

2. The information processing apparatus according to claim 1, wherein the reference image defocus amount map and the search image defocus amount map include a reliability value map indicating a reliability value of the defocus amount.

3. The information processing apparatus according to claim 1, wherein the reference image defocus amount map and the search image defocus amount map are converted into a distance map from a position where the defocus amount is 0.

4. The information processing apparatus according to claim 3, wherein a distance of the distance map is determined by an optical characteristic of a lens used at a time of obtaining the defocus amount map and an imaging condition.

5. The information processing apparatus according to claim 3, wherein
a distance of the distance map is
predicted using a predicting unit learned by
the defocus amount map in which an optical characteristic of a lens used at a time of obtaining the defocus amount map and an imaging condition are known, and
a distance map converted into a distance by the optical characteristic of the lens and the imaging condition.

6. A control method for an information processing apparatus comprising:
obtaining a reference image including a tracking target object and a search image including the tracking target object;
obtaining a reference image defocus amount map including a value indicating a defocus amount in each pixel constituting the reference image and a search image defocus amount map including a value indicating a defocus amount in each pixel constituting the search image;
extracting a feature from each of the reference image, the search image, the reference image defocus amount map, and the search image defocus amount map;
performing correlation calculation regarding a feature of the reference image and the search image and feature of the reference image defocus amount map and the search image defocus amount map; and
calculating a tracking result including a position of the tracking target object in the search image by using a result of the correlation calculation, wherein
parameters used by the extracting and the calculating are obtained by learning by
obtaining ground truth including a position of the tracking target object,
calculating an error from the tracking result and the ground truth, and
updating parameters of the extracting and the calculating on a basis of the error.

7. A non-transitory computer-readable storage medium storing a program which, when executed by a computer comprising a processor and a memory, causes the computer to:
obtain a reference image including a tracking target object and a search image including the tracking target object;
obtain a reference image defocus amount map including a value indicating a defocus amount in each pixel constituting the reference image and a search image defocus amount map including a value indicating a defocus amount in each pixel constituting the search image;
extract a feature from each of the reference image, the search image, the reference image defocus amount map, and the search image defocus amount map;
perform correlation calculation regarding a feature of the reference image and the search image and feature of the reference image defocus amount map and the search image defocus amount map; and
calculate a tracking result including a position of the tracking target object in the search image by using a result of the correlation calculation, wherein
parameters used by the extracting and the calculating are obtained by learning by
obtaining ground truth including a position of the tracking target object,
calculating an error from the tracking result and the ground truth, and
updating parameters of the extracting and the calculating on a basis of the error.

* * * * *